United States Patent [19]

Fenwick

[11] 4,383,351
[45] May 17, 1983

[54] UNIVERSAL CLAMP

[76] Inventor: Loel Fenwick, S 161 Adams, Spokane, Wash. 99204

[21] Appl. No.: 314,235

[22] Filed: Oct. 23, 1981

[51] Int. Cl.³ .......................... A44B 21/00; F16L 3/08; F16B 2/18
[52] U.S. Cl. ............................... 24/263 B; 24/249 R; 248/279; 248/214; 269/328; 269/77
[58] Field of Search .......... 24/69 TS, 71 T, 132 WL, 24/133, 134 L, 134 N, 248 R, 248 B, 248 E, 249 R, 254, 257 R, 263 B, 263 CA; 248/214, 279, 286, 287, 298; 128/346; 403/391, 389, 400; 269/77, 78, 328

[56] References Cited

U.S. PATENT DOCUMENTS

| | | | |
|---|---|---|---|
| 605,855 | 6/1898 | Colborne | 269/78 |
| 2,308,105 | 1/1943 | Purdy | 24/263 B |
| 2,614,558 | 10/1952 | Lovell | 269/328 |
| 2,618,452 | 11/1952 | Imhof | 248/279 |
| 2,680,459 | 6/1954 | Dodsen et al. | 24/263 B |
| 2,696,996 | 12/1954 | Engelhardt | 248/279 |
| 3,221,743 | 12/1965 | Thomson et al. | 248/279 |
| 4,018,412 | 4/1977 | Kees, Jr. et al. | 24/248 R |
| 4,252,306 | 2/1981 | Johnson et al. | 269/328 |

Primary Examiner—Paul J. Hirsch
Assistant Examiner—Paul S. Polakowski
Attorney, Agent, or Firm—Wells, St. John & Roberts

[57] ABSTRACT

A universal clamp for an adjustable post includes a split base clamp mounted on a stationary supporting stud. An elongated channel in the form of a yoke including a rigid extension protruding through the split base clamp slidably supports a pair of opposed jaws adapted to engage the post. The channel is enclosed within a covering sleeve. One jaw is fixed with respect to the sleeve. The remaining jaw is operably movable through a lever operator and interposed over-center toggle plate. Manipulation of the lever operator tensions the channel and extension. This tightens the split base clamp. It also engages complementary radial serrations surrounding the extension on one end of the sleeve and on the split base clamp. The jaws are compressively moved toward one another through the toggle plate and interposed sleeve to grasp the post and thereby fix its position relative to the mounting stud.

4 Claims, 11 Drawing Figures

UNIVERSAL CLAMP

TECHNICAL FIELD

My invention relates to a universal clamp for movable positioning of a post relative to a mounting stud on a supporting structure.

BACKGROUND OF THE INVENTION

My invention was specifically designed to movably mount auxiliary elements, such as leg-supporting stirrups, to a hospital or therapeutic bed, obstetrical table, operating table or similar structure. However, my invention is not intended to be limited to these specific applications.

Known prior art clamps for this purpose typically use compressive forces exerted between a handle and a remote post jaw to lock intermediate clamping surfaces that fix the clamp to a stud and position a post relative to the clamp. This arrangement locates the base clamp, which engages the stud or post, at a central offset position between the other clamp elements. The handle section protrudes to one side of the base clamp. The post clamp section protrudes to its other side. Such a clamp configuration cannot be folded out of the way, since it is mounted to the supporting structure intermediate its operative ends.

The present invention makes possible a foldable clamp assembly by locating the base clamp remote from the handle and positioning the post clamp between the base clamp and handle. The entire clamp unit thus protrudes to one side of the stud or post, and can pivot about it to a folded storage position.

The key to the repositioning of the clamp elements lies in the provision of a channel and sleeve combination which cooperatively straddle the post location to apply compression forces to a pair of "floating" post clamp jaws. At the same time, tension forces are applied to an outer extension of the channel to activate the base clamp and angular clamp assemblies. This provides single lever actuation to a new geometric relationship of clamp elements. The result is a mechanically effective clamp with improved aesthetic values and foldable storage capability.

BRIEF DESCRIPTION OF DRAWINGS

A preferred embodiment of the invention is illustrated in the accompanying drawings in which.

BEST MODE FOR CARRYING OUT THE INVENTION

My invention provides a new clamp for receiving an adjustable post. The clamp is movably attached to a stationary mounting stud. A typical application of the clamp is illustrated in combination with a hospital bed or medical examination chair. The clamp is used to receive a post that supports a movably adjustable stirrup. While the clamp is released, the stirrup can be moved to any desired position relative to its supporting structure. While the jaws of the clamp that secure the post are open, the post can slide axially between the jaws. Furthermore, the jaws can pivot about an axis perpendicular to the post, and the entire clamp can pivot about an axis through the mounting stud.

The clamp thus provides three perpendicular axes of rotation for the post: one about the clamp mounting stud; one about the centerline along the clamp body; and one about the center post axis between the clamp jaws.

Figure 10:
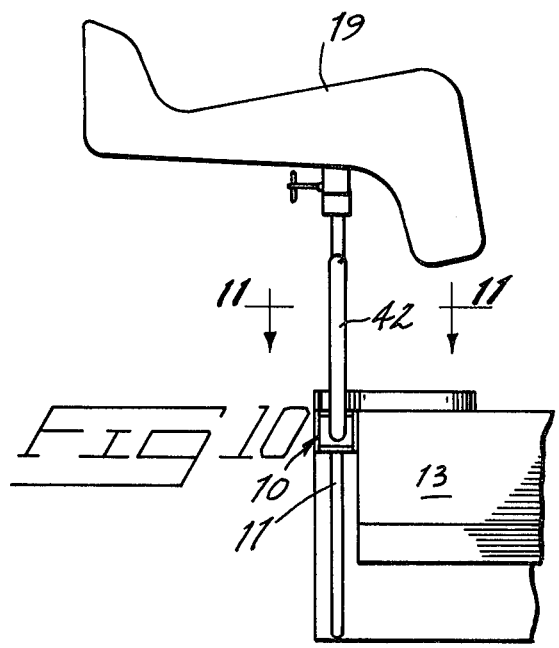
FIG. 10 is a side view of the clamp in use.
Figure 11:
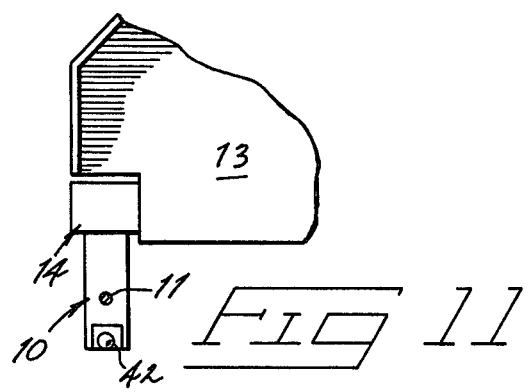
FIG. 11 is a sectional view of the clamp in use as seen along line 11—11 in FIG. 10.

Clamp 10 is adapted to adjustably position a post 11 relative to a stationary mounting stud 12 in the manner generally indicated in FIGS. 10 and 11. Clamp 10 can engage post 11 at any location along its length and at any angular position about the post axis. The clamp 10 further permits pivotal adjustment of post 11 about a center line along the clamp body, which is perpendicular to the post axis. Finally, clamp 10 is pivotable about the stud axis, which in turn is oriented perpendicularly relative to the other two axes.

Post 11 can be used to support any desired apparatus, such as the illustrated stirrup 19. It is not intended to be limited to support of a stirrup, and could be used to suspend intravaneous equipment, various containers, and other patient supports. Similarly, while stud 12 is shown as being fixed to a bed structure 13, it might be provided on any support structure or framework where movable attachment of an auxiliary post is required.

The operational elements of clamp 10 are best seen in FIGS. 1 through 6.

Clamp 10 includes an elongated channel having a yoke shape including parallel spaced side rails 15 and an outer extension 16. The rigid extension 16 protrudes outward from one end of the joined side rails 15. The opposite ends of the side rails 15 are open.

Figure 1:
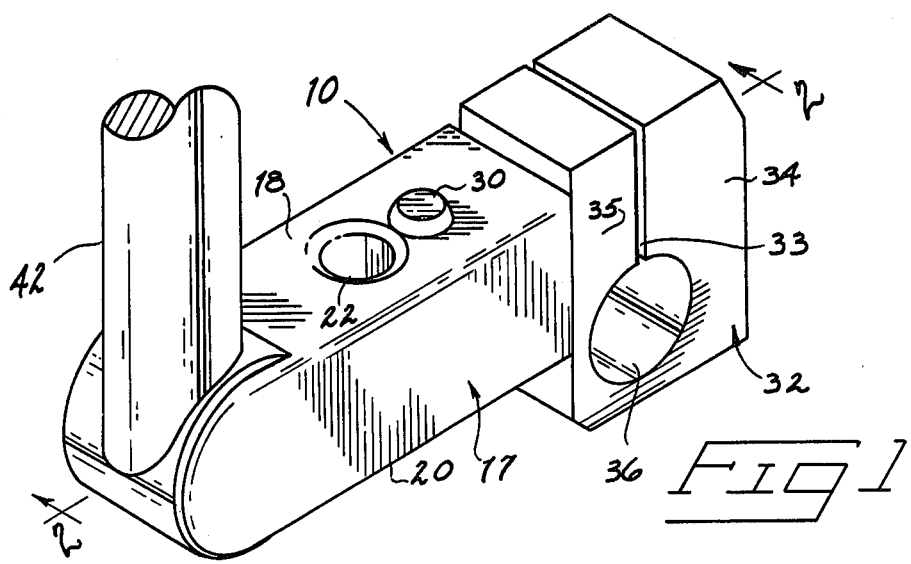
FIG. 1 is an isometric view.
Figure 2:
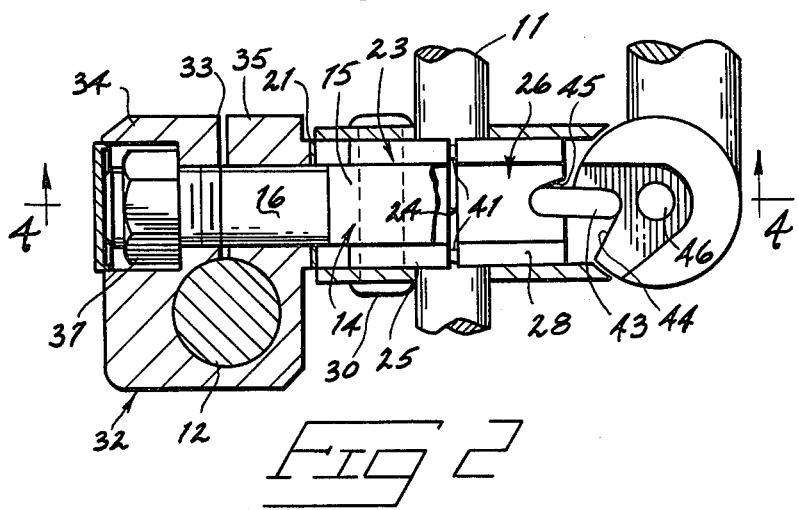
FIG. 2 is a sectional view of the invention in the clamped position taken along line 2—2 in FIG. 1.
Figure 3:
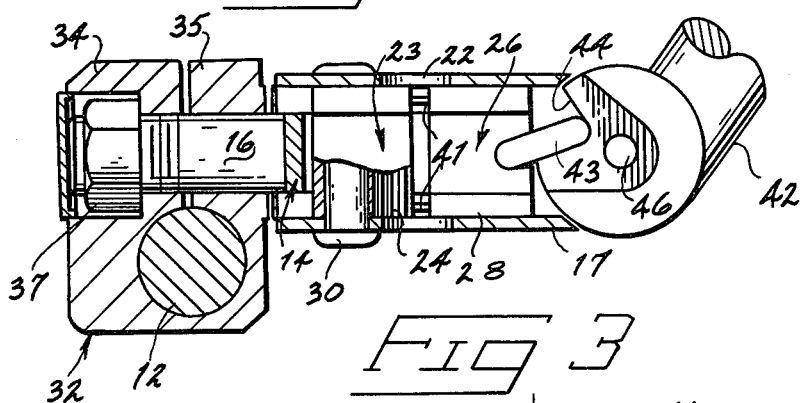
FIG. 3 is a sectional view similar to FIG. 2, showing the released position.
Figure 4:
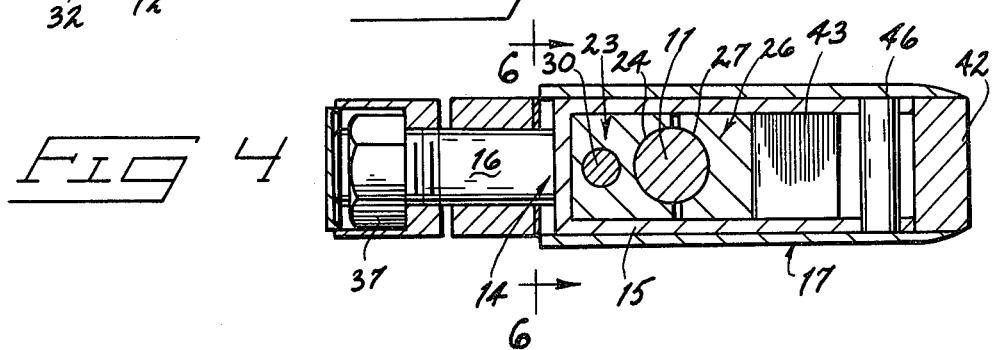
FIG. 4 is a sectional view taken along line 4—4 in FIG. 2.

Channel 14 is enclosed within an elongated sleeve 17 which has a substantially square cross-sectional tubular configuration. Sleeve 17 includes two pairs of opposed side walls indicated by the reference numerals 18 and 20, respectively. The side walls 18 and 20 are rigid and movably fitted about the side rails 15 of channel 14 (FIGS. 2 through 4). The outer extension 16 of channel 14 protrudes through end plate 21, which is fixed across the sides 18 and 20 at a first end of sleeve 17.

The opposed sides 18 of sleeve 17 include aligned openings 22 which are formed through them to permit sleeve 17 to freely receive the supported post 11.

Post 11 is adapted to be operatively gripped by a pair of jaws 23 and 26. The first jaw 23 is positioned within sleeve 17 to one side of the openings 22, while the second jaw 26 is similarly positioned to the remaining side of the openings. A serrated clamp face 24 across first jaw 23 is located in adjacent opposition to a similar clamp face 27 across the second jaw 26. Jaws 23 and 26 are adapted to selectively grip the post 11 when closed against it. When released, they permit movement of the post both axially and angularly relative to the center post axis.

The first jaw 23 is movable relative to channel 14. It has spaced guide shoulders 25 at each side which slidably ride along the side rails 15. Similar guide shoulders 28 are provided on the second jaw 26. The jaws 23 and 26 are yieldably urged apart by yieldable biasing means shown as four compression springs 41 partially inset within their respective clamp faces 24 and 27.

The first jaw 23 is fixed in position relative to sleeve 17. This is accomplished through an interlocking pin 30 received through coaxial apertures formed through the sleeve sides 18 and the body of the jaw 23.

A base clamp 32 is located adjacent to end plate 21 of sleeve 17. It includes a split aperture 33 adapted to receive the stud 12 or other mounting post on which clamp 10 is supported. The split aperture 33 defines two integral clamp segments. The outermost clamp segment is designated by reference numeral 34, while the innermost clamp segment is designated by numeral 35. Both clamp segments 34 and 35 have aligned apertures 36 formed transversely through them.

The outer extension 16 of channel 14 is received through the aligned apertures 36. The outer end of extension 16 is operably connected to the outermost clamp segment 34 by means of a nut 37 threadably engaged about extension 16. Nut 37 is fitted within a recess in the clamp segment, and is covered by a flush removable cover plate 38. Alternatively, the outer end of extension 16 could be directly threaded to the clamp segment 34.

Figure 5:
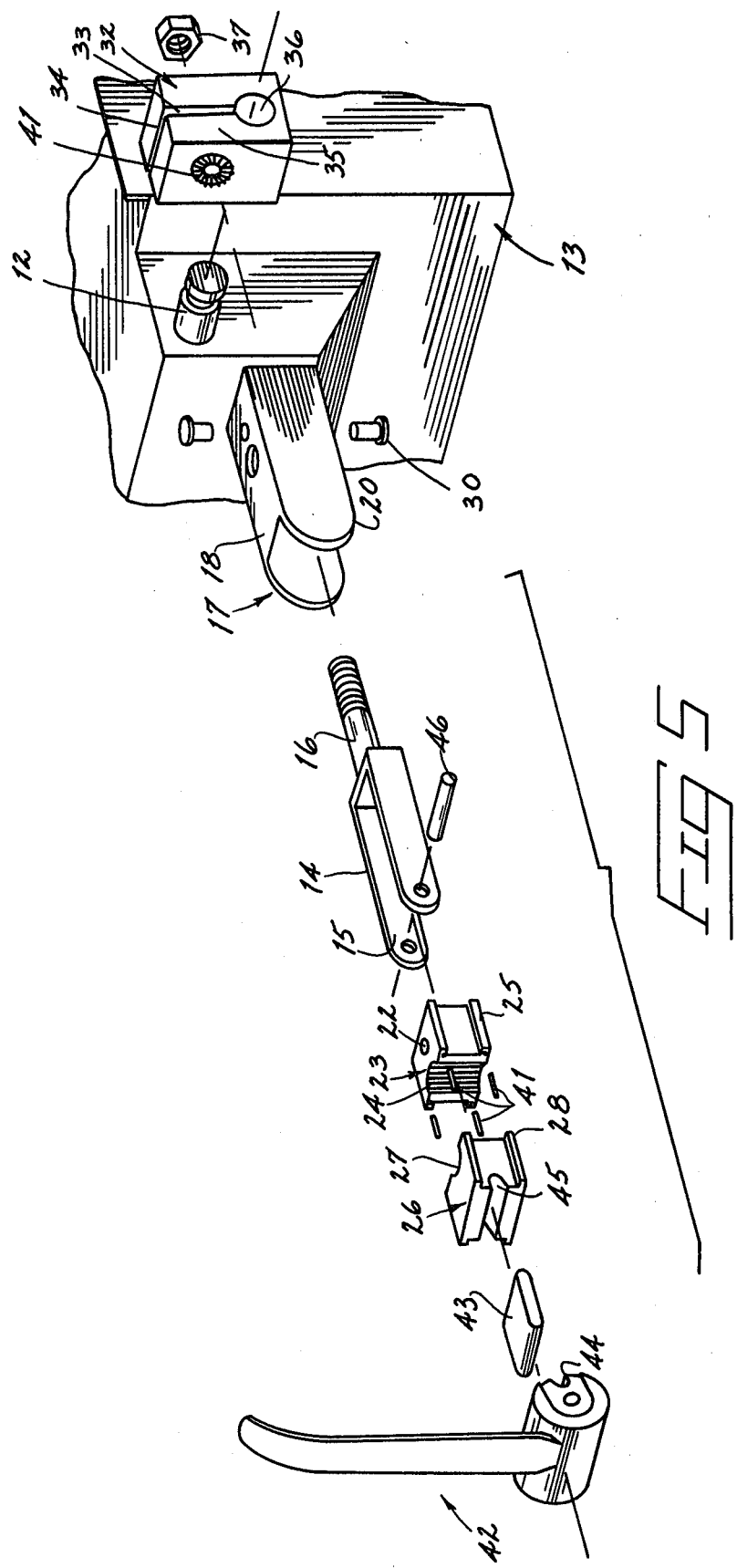
FIG. 5 is an exploded view.
Figure 6:
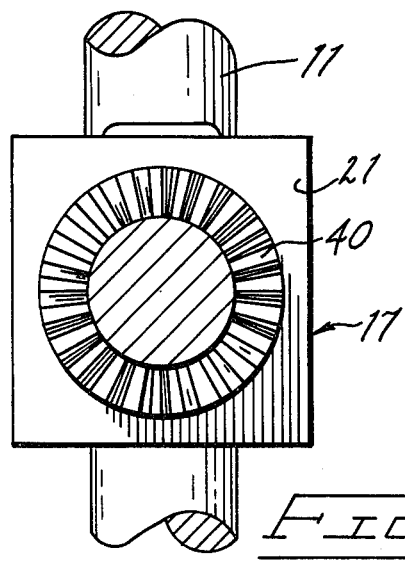
FIG. 6 is a sectional view taken along line 6—6 in FIG. 4.

As can be seen in FIG. 6, the end plate 21 across sleeve 17 has a radial pattern of serrations 40 centered about the axis of extension 16. A complementary pattern of serrations 41 is formed on the adjacent outer surface of clamp segment 35 (FIG. 5). The serrations 40 and 41 are located in adjacent opposition to one another about the extension 16.

Clamp 10 is controlled by a pivotable lever 42. The base of lever 42 is mounted across the open ends of channel 14 by a pivot pin 46. Lever 42 is movable between the angular position shown in FIG. 2 (locked position) and the angular position shown in FIG. 3 (released position).

Force is transmitted between lever 42 and the second jaw 26 by an interposed toggle plate 43. One end of toggle plate 43 rests within a transverse arcuate slot 44 formed across the base of lever 42. The opposite end of plate 43 rests within a complementary arcuate slot 45 formed across the jaw 26. Slots 44 and 45 permit plate 43 to move between the angular position shown in FIG. 3 and the over-center position shown in FIG. 2. A center line along plate 43 will lie to one side of the axis of pin 46 when clamp 10 is locked, and will lie substantially to the opposite side of the pin axis when the clamp 10 is released. Toggle plate 43 is effectively maintained in its over-center locked condition by the substantial compressive forces which result due to clamping engagement of the jaws 23, 26, serrations 40, 41, and clamp segments 34, 35, as described below.

The lever 42 acts as a handle or operator by which the user can position clamp 10 with one hand while holding and positioning post 11 with the other. Lever 42 is operably connected between the open end of channel 14 (by pivot pin 46) and the second jaw 26 (by toggle plate 43) for tensioning the channel 14 and extension 16 to draw the two clamp segments 34 and 35 and serrated surfaces 40 and 41 toward one another in compression. This in turn results in the first and second jaws 23 and 26 being compressively moved toward one another through the interposed sleeve 17 and pin 30 to grasp a post 11 received through the sleeve openings 24. In this manner, the position of a post between the jaws is releasably fixed relative to the mounting stud by operation of clamp 10.

Since the first and second jaws 23 and 26 effectively "float" along the length of channel 14, the entire assembly can be pre-tensioned by tightening or loosening nut 37 on the extension 16. Such pre-tensioning will control the axial forces ultimately exerted on the three aligned clamp mechanisms operated through the toggle plate 43. The substantial gripping forces used to assure a fixed position of post 11 assure against movement of post 11 and accidental release of the over-center toggle plate 43. However, only slight angular movement of lever 42 is required to release these substantial forces due to the geometry of the toggle mechanism.

Figure 7:
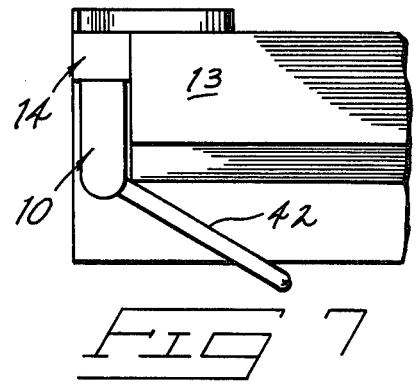
FIG. 7 is a side view showing the clamp in its storage position.
Figure 8:
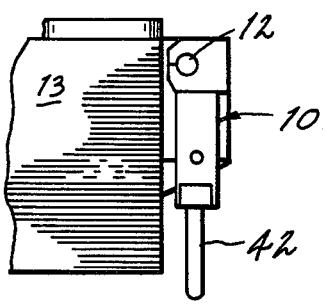
FIG. 8 is a front view illustrating the stored clamp.
Figure 9:
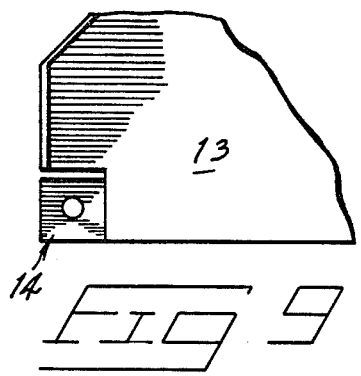
FIG. 9 is a top view illustrating the stored clamp.

As seen in FIGS. 7, 8 and 9, the clamp 10 is capable of being stored adjacent to upright surfaces on the bed structure 13. It can be recessed within a corner of the bed structure as shown, or can be mounted to a stud protruding outward from any side surface along the bed structure. When recessed, the clamp 10 can be hung in a vertical position located within the corner recess so as to be very unobtrusive and aesthetically compatible with the bed design. This folded storage condition was not possible with prior clamps where the stud was engaged at an axial location between the operating handle or lever and the post jaws.

Modifications might be made with respect to the mechanical details of the clamp elements without deviating from the basic structure as described. For these reasons, the present disclosure is intended to be not limited beyond the definitions of the attached claims.

I claim:

1. A universal clamp for adjustable positioning of a post relative to a stationary mounting stud, comprising:

an elongated channel having a rigid extension protruding outward from one end;

an elongated sleeve having opposed rigid side walls movably fitted about said channel with said extension protruding outward from within the sleeve beyond a first sleeve end;

aligned openings formed through opposed sides of the sleeve and adapted to freely receive a post;

a first jaw positioned within said sleeve to one side of said openings, said first jaw being movable relative to said channel;

means fixing said first jaw to said sleeve;

a second jaw positioned within said sleeve to the remaining side of said openings in adjacent opposition to said first jaw, said second jaw being movable relative to said channel;

a base clamp having a split aperture adapted to receive a mounting stud between two integral clamp segments, said clamp segments having aligned apertures formed transversely through them;

said extension being received through the aligned apertures in said clamp segments;

means operably connecting the outer end of said extension and the outermost clamp segment;

first and second complementary outer surfaces formed about said extension on the first sleeve end and innermost clamp segment, respectively, in adjacent opposition to one another; and operator means operably connected between the remaining end of said channel and said second jaw for tensioning said channel and extension to draw the two clamp segments of the base clamp and said first and second outer surfaces of the first sleeve end and innermost clamp segment toward one another in compression and for compressively moving said first and second jaws toward one another through the interposed sleeve to grasp a post received through the sleeve openings;

whereby the position of a post located between the jaws can be releasably fixed relative to the mounting stud by manipulation of said operator means.

2. A universal clamp as set out in claim 1 further comprising:
yieldable biasing means operably connected between said first and second jaws for urging them apart.

3. A universal clamp as set out in claim 1 wherein said operator means comprises:
a lever pivotally connected to said remaining end of said channel;
and an over-center toggle assembly interconnecting said lever and said second jaw.

4. A universal clamp as set out in claim 1 wherein said means operably connecting the outer end of said extension and the outermost clamp segment comprises a nut threadably engaged to said extension and bearing against the outermost clamp segment.

* * * * *